(12) United States Patent  
Iwasaki

(10) Patent No.: US 7,576,616 B2  
(45) Date of Patent: Aug. 18, 2009

(54) PHASE CONTROLLING APPARATUS, FREQUENCY CONTROLLING APPARATUS, OSCILLATING APPARATUS, PHASE CONTROLLING METHOD, AND FREQUENCY CONTROLLING METHOD

(75) Inventor: Katsuhito Iwasaki, Kanagawa (JP)

(73) Assignee: Agilent Technologies, Inc., Santa Clara, CA (US)

( * ) Notice: Subject to any disclaimer, the term of this patent is extended or adjusted under 35 U.S.C. 154(b) by 96 days.

(21) Appl. No.: 11/509,155

(22) Filed: Aug. 24, 2006

(65) Prior Publication Data

US 2007/0046380 A1 Mar. 1, 2007

(30) Foreign Application Priority Data

Aug. 29, 2005 (JP) .............................. 2005-248153

(51) Int. Cl.
*H03B 27/00* (2006.01)
*G06F 1/02* (2006.01)
*H04L 25/38* (2006.01)

(52) U.S. Cl. ........................... 331/45; 331/56; 327/106; 375/369; 708/271

(58) Field of Classification Search ................... 331/45, 331/56; 327/106; 708/271; 375/369
See application file for complete search history.

(56) References Cited

U.S. PATENT DOCUMENTS 5,260,842 A * 11/1993 Leake et al. ................... 360/51

| | | | | |
|---|---|---|---|---|
| 5,598,437 A * | 1/1997 | Gourse | ......................... | 375/308 |
| 5,943,010 A * | 8/1999 | Rudish et al. | ................ | 342/372 |
| 6,664,819 B2 * | 12/2003 | Kishi | .......................... | 327/106 |
| 6,778,138 B2 * | 8/2004 | Purdy et al. | .................. | 342/377 |
| 7,142,622 B1 * | 11/2006 | Brunn et al. | ................. | 375/375 |

FOREIGN PATENT DOCUMENTS

JP 2004-317345 11/2004

OTHER PUBLICATIONS

"A Technical Tutorial on Digital Signal Synthesis". Analog Devices. Copyright © 1999 Analog Devices, Inc.
Brandon, David. "Synchronizing Multiple AD9852 DDS-Based Synthesizers". © 2003 Analog Devices, Inc.

* cited by examiner

*Primary Examiner*—Benny Lee
*Assistant Examiner*—Levi Gannon

(57) ABSTRACT

A phase controlling apparatus is disclosed. The phase controlling apparatus controls phases of signals which are output from a plurality of signal sources corresponding to first phase information which indicates a phase of a predetermined signal. The phase controlling apparatus includes a phase information storing section and a phase controlling section. The phase information storing section stores second phase information which indicates a phase of a signal which is output from each of the plurality of signal sources. The phase controlling section changes a phase of a signal which is output from at least one of the plurality of signal sources corresponding to the second phase information stored in the phase information storing means to control the difference of phases of signals which are output from the plurality of signal sources.

13 Claims, 8 Drawing Sheets

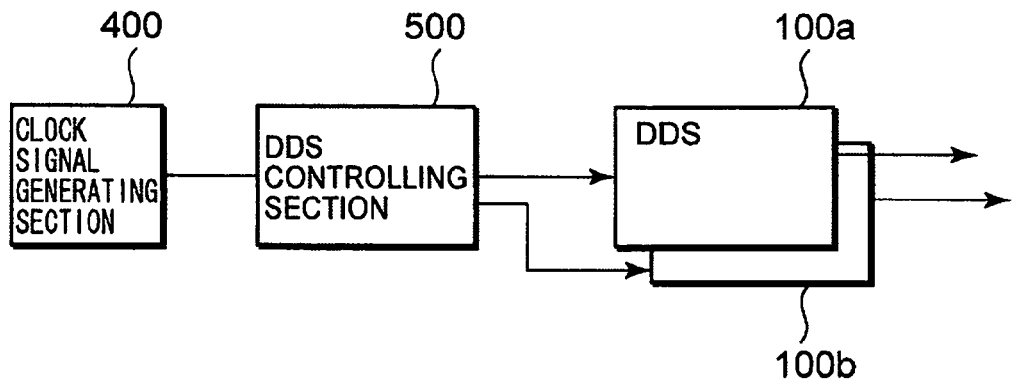
FIG.8
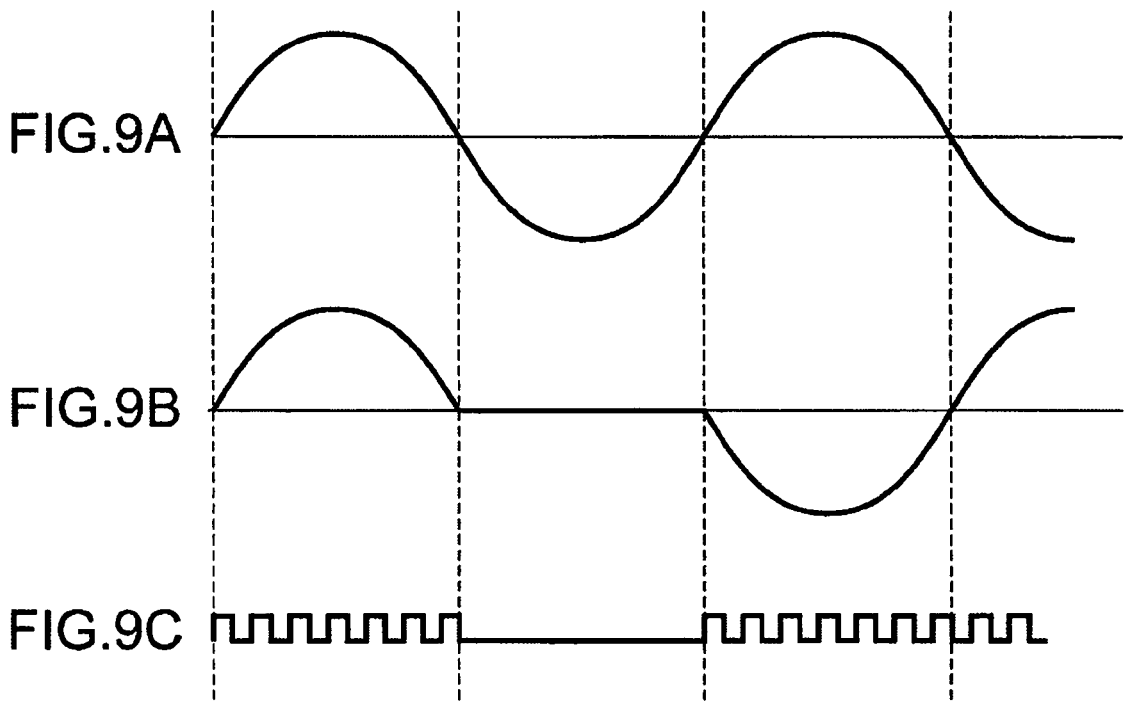
FIG.9A
FIG.9B
FIG.9C

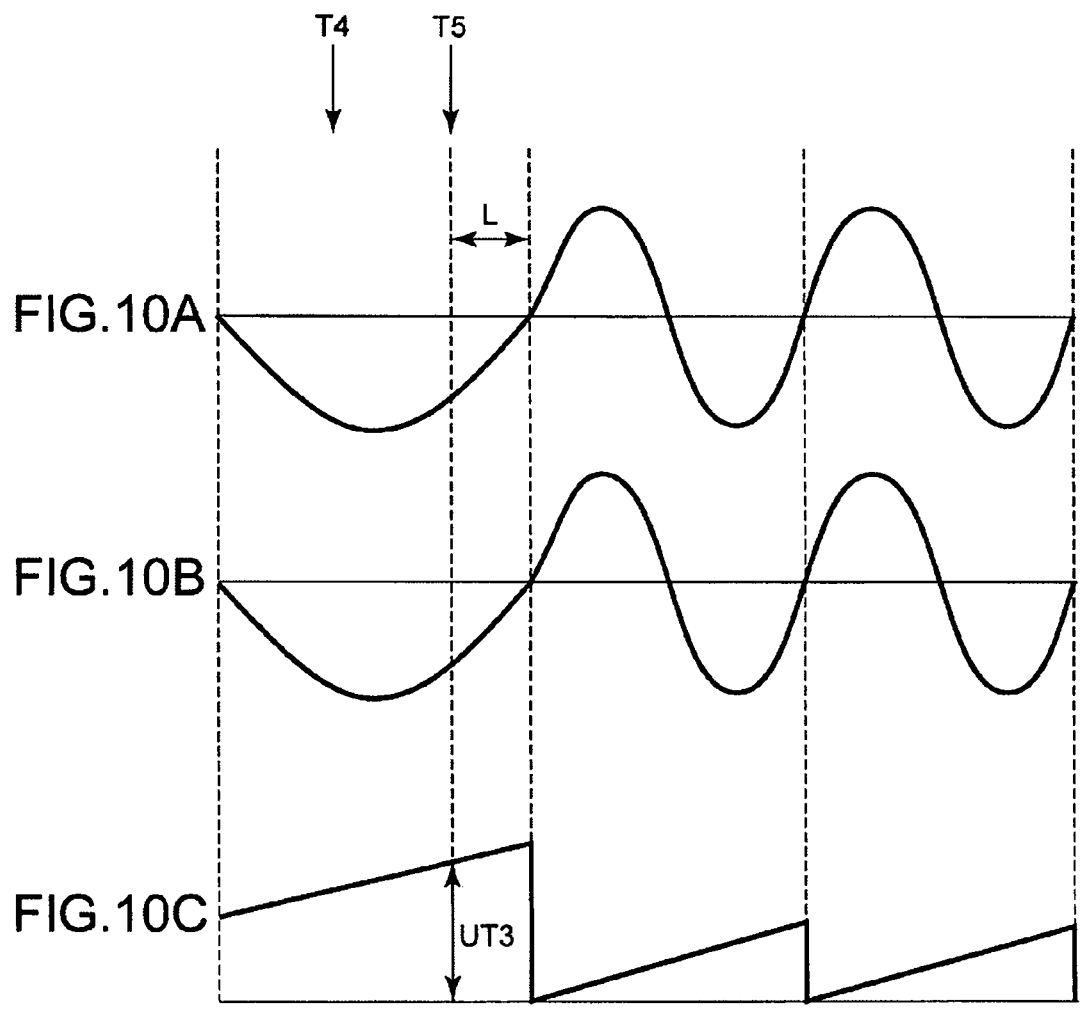

PHASE CONTROLLING APPARATUS, FREQUENCY CONTROLLING APPARATUS, OSCILLATING APPARATUS, PHASE CONTROLLING METHOD, AND FREQUENCY CONTROLLING METHOD

BACKGROUND OF THE INVENTION

1. Field of the Invention

The present invention relates to control the difference of phases of a plurality of signal sources and to control changes of frequencies thereof.

2. Description of the Related Art

When an impedance measurement instrument or the like is used, it may be necessary to set it so that signals that a plurality of signal sources generate have different phases. Recently, as such signal sources, a Direct Digital Synthesizer (abbreviated as a DDS) has been widely used. A DDS has a table of phases and signal output values and a Digital-Analog converter (hereinafter referred to as a D/A converter). The DDS can output a signal of a sine wave.

When the phase of the DDS is controlled, the phase shifting is affected by the bit resolution of a register that adjusts the phase offset. Thus, it was difficult to finely control the phase of the DDS. When an impedance is measured, it is necessary to accurately measure the gain of an amplifier of a voltage measurement section. To do that, it is necessary to improve the phase resolution.

To control to change the phase of the DDS that is operating, since a Band Pass Filter (hereinafter abbreviated as a BPF) is disposed at an output of the DDS, a transient takes place in the waveform that is output from the DDS. Thus, it takes a time until the waveform becomes stable.

In addition, when an impedance is measured, it is necessary to accurately measure the gain of the amplifier of the voltage measurement section as disclosed in a related art reference for example Japanese Patent Application Unexamined Publication No. 2004-317345.

SUMMARY OF THE INVENTION

As was described above, when the phase of the DDS is controlled, since the phase shifting is affected by the bit resolution of the register that adjusts the phase offset, it is difficult to finely control the phase of the DDS. When the phase of the signal is controlled and the frequency thereof is changed, a transient takes place in the waveform of the signal. As a result, it takes a time until the waveform becomes stable.

The present invention is made from the foregoing point of view. It would be desirable to provide a DDS controlling apparatus and so forth that allow the phase or frequency of a signal to be changed in various manners without an influence of the bit resolution of a register of the DDS, which adjusts a phase offset, and a transient to be short in the waveform of a signal when the phase or frequency thereof is changed.

According to an embodiment of the present invention, there is provided a phase controlling apparatus which controls phases of signals which are output from a plurality of signal sources corresponding to first phase information which indicates a phase of a predetermined signal. The phase controlling apparatus includes a phase information storing section and a phase controlling section. The phase information storing section stores second phase information which indicates a phase of a signal which is output from each of the plurality of signal sources. The phase controlling section changes a phase of a signal which is output from at least one of the plurality of signal sources corresponding to the second phase information stored in the phase information storing section to control the difference of phases of signals which are output from the plurality of signal sources. The "first phase information" corresponds to phase information stored in a phase accumulator of a DDS. The "second phase information" corresponds to phase information stored in a phase counter of a DDS controlling section. The "signal source" corresponds to a DDS. The phase controlling apparatus corresponds to a DDS controlling section and a computer section.

Thus, besides phase information used for oscillation of a DDS, phase information for the DDS is provided. Thus, the phase of the DDS can be flexibly controlled corresponding to the phase information for the DDS.

When the second phase information has a higher phase resolution than the phase offset adjusting section does, the phase difference can be more accurately controlled.

When a value of a signal which is output from a signal source under control becomes zero, the phase controlling section controls the signal source to stop outputting the signal and after a predetermined period of time has elapsed, the phase controlling section controls the signal source to start outputting the signal.

The phase controlling section starts controlling the signal source early for a predetermined period of time necessary after a control signal is input to the signal source until it outputs a signal corresponding to the control signal. The "predetermined period of time" corresponds to the latency of the internal circuit of the signal source.

The plurality of signal sources are direct digital synthesizers which output sine waves. The signal sources may generate square waves or triangular waves.

The phase controlling apparatus includes a clock signal generating section that generates a clock signal to each section of the phase controlling apparatus and each of the plurality of signal sources which are operated based on the clock signal. The phase information storing section has a phase counter which performs a count operation with the clock signal. The phase controlling section has a first register, a second register, and a control signal sending section. The first register stores first phase timing information with which a control signal which causes a signal source under control to stop outputting the signal is sent. The second register stores second phase timing information with which a control signal which causes the signal source under control to start outputting the signal is sent. The control signal sending section compares phase information which is output from the phase counter of the phase information storing section corresponding to a reference signal source with the first phase timing information stored in the first register and sends the control signal to the signal source under control. The control signal causes the signal source under control to stop outputting the signal when they match. In addition, the control signal sending section compares phase information which is output from the phase counter with the second phase timing information stored in the second register and sends the control signal to the signal source under control. The control signal causes the signal source under control to start outputting the signal when they match. The "phase timing information" corresponds to update data. The "control signal sending section" corresponds to a DDS trigger controlling circuit.

According to an embodiment of the present invention, there is provided an oscillating apparatus. The oscillating apparatus includes a plurality of signal sources, a phase information storing section, and a phase controlling section. The plurality of signal sources output signals corresponding to first phase information which indicates a phase of a predetermined signal. The phase information storing section stores second phase information which indicates a phase of a signal which is output from each of the plurality of signal sources. The phase controlling section changes a phase of a signal which is output from at least one of the plurality of signal sources corresponding to the second phase information stored in the phase information storing section to control the difference of phases of signals which are output from the plurality of signal sources. The "frequency controlling section" corresponds to the DDS controlling section and the computer section.

Since the frequency is changed with a phase of 360 degrees, the transient period becomes short and a waveform can be quickly and stably obtained.

According to an embodiment of the present invention, there is provided a phase controlling apparatus which controls phases of signals which are output from a plurality of signal sources based on a clock signal. The phase controlling apparatus includes a phase controlling section. The phase controlling section stops supplying the clock signal to a predetermined one of the plurality of signal sources for a predetermined period of time and then starts supplying the clock signal to the signal source so as to control the phases of the signals which are output from the plurality of signal sources. The "phase controlling section" corresponds to the DDS controlling section.

As was described above, the phase of a signal can be controlled with high accuracy. In addition, the phase and frequency of a signal can be changed in a short transient period.

These and other objects, features and advantages of the present invention will become more apparent in light of the following detailed description of best mode embodiments thereof, as illustrated in the accompanying drawings.

BRIEF DESCRIPTION OF DRAWINGS

FIG. 8 is a block diagram showing a structure of circuitry that controls a clock signal supplied to a DDS and changes the phase of a signal according to an embodiment of the present invention;

FIG. 9A to FIG. 9C are schematic diagrams showing waveforms of signals that are output from individual sections of an oscillating apparatus shown in FIG. 8; and FIG. 10A to FIG. 10C are schematic diagrams showing waveforms of signals that are output from individual sections of the oscillating apparatus when the frequency of a sine wave of an output signal of a DDS is changed.

DESCRIPTION OF PREFERRED EMBODIMENTS

Figure 1:
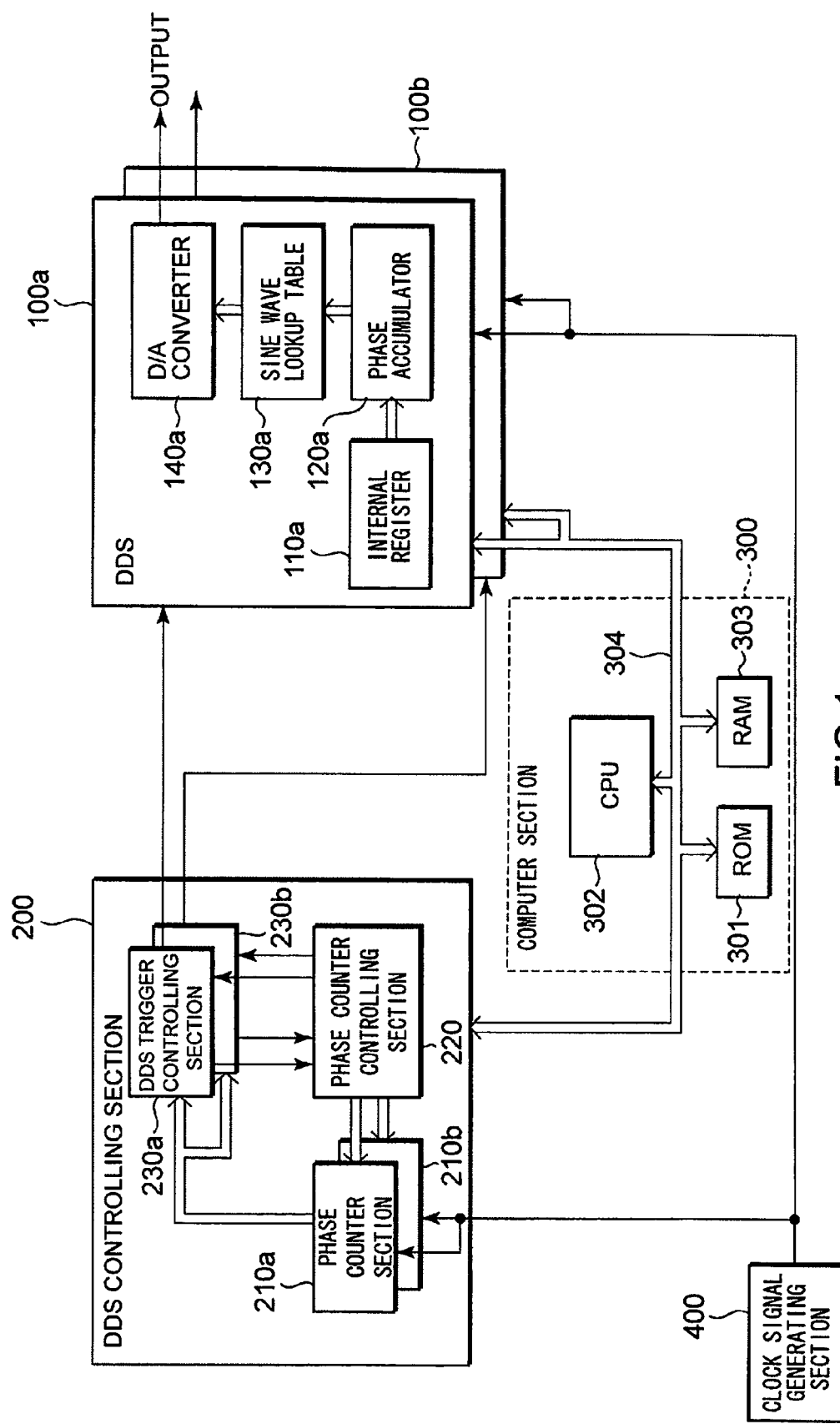
FIG. 1 is a block diagram showing the structure of an oscillating apparatus using a DDS according to an embodiment of the present invention.

Next, with reference to the accompanying drawings, embodiments of the present invention will be described. FIG. 1 is a block diagram showing the structure of an oscillating apparatus using two DDSs according to an embodiment of the present invention. As shown in FIG. 1, the oscillating apparatus according to this embodiment is composed of a DDS 100a, a DDS 100b, a DDS controlling section 200, a computer section 300, and a clock signal generating section 400. The DDS controlling section 200 controls the DDS 100a and the DDS 100b. The clock signal generating section 400 supplies a clock signal to each section of the oscillating apparatus.

The computer section 300 has a ROM 301, a CPU 302, and a RAM 303. The ROM 301 stores a program and data. The CPU 302 executes the program stored in the ROM 301. The RAM 303 is used as a work area and so forth on which the CPU 302 executes processes. The computer section 300 sends data such as frequencies, phases, and so forth to the DDS controlling section 200, the DDS 100a, and the DDS 100b through a data bus 304.

The DDS 100a has an internal register 110aa, a phase accumulator 120a, a sine wave lookup table 130a, and a D/A converter 140a. The internal register 110a stores data of phases and frequencies sent from the computer section 300. The phase accumulator 120a outputs step-shaped waveforms corresponding to phases and frequencies stored in the internal register 110a. The sine wave lookup table 130a converts phase data that are output from the phase accumulator 120a into data that represent an output value of a sine wave corresponding to the phase. The D/A converter 140a converts data that are output from the sine wave lookup table 130a into an analog signal.

The structure of the DDS 100b is the same as that of the DDS 100a. In other words, the DDS 100b has an internal register 110b, a phase accumulator 120b, a sine wave lookup table 130b, and a D/A converter 140b (not shown).

The internal registers 110a and 110b have phase offset adjustment registers that shift the phases of the phase accumulators 120a and 120b, respectively. The DDS 100a and the DDS 100b shift the phases of the phase accumulators 120a and 120b corresponding to data written in the phase offset adjustment registers, respectively.

Figure 2:
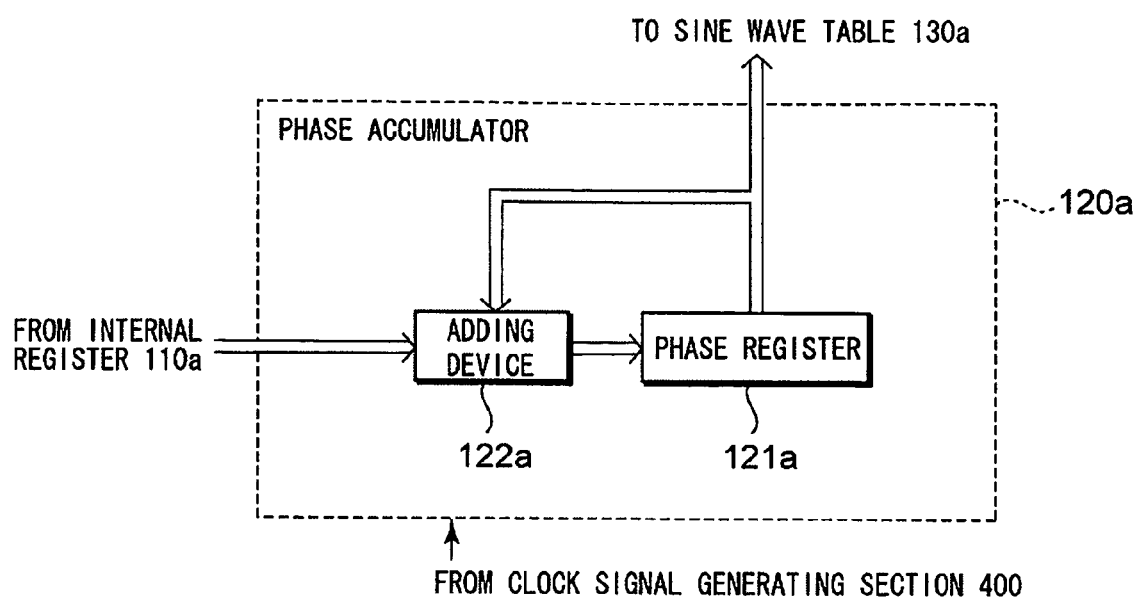
FIG. 2 is a block diagram showing the structure of a phase accumulator.

FIG. 2 is a block diagram showing the structure of the phase accumulator 120a. As shown in FIG. 2, the phase accumulator 120a has a phase register 121a and an adding device 122a. The phase register 121a stores phase data. The adding device 122a adds an output of the phase register 121a and phase data sent from the internal register 110a and outputs the result to the phase register 121a.

The DDS controlling section 200 has a phase counter section 210a, a phase counter section 210b, a phase counter controlling section 220, a DDS trigger controlling section 230a, and a DDS trigger controlling section 230b. The phase counter section 210a indicates the same phase as the phase of the DDS 100a that the phase accumulator 120a indicates. The phase counter section 210b indicates the same phase as the phase of the DDS 100b that the phase accumulator 120b indicates. The phase counter controlling section 220 sets data to the phase counter section 210a when the computer section 300 issues frequency and phase setup requests. The DDS trigger controlling section 230a outputs a change trigger signal to the DDS 100a at timing considering the latency of a DDS when the phase counter controlling section 220 issues a frequency or phase change request for the DDS. The DDS trigger controlling section 230b outputs a change trigger signal to the DDS 100b at timing considering the latency of a DDS when the phase counter controlling section 220 issues a frequency or phase change request for the DDS. The latency of a DDS is a period of time after a control signal is input to the DDS until an output signal thereof is affected by the control signal. The latency takes place due to a pipeline delay and so forth of a DDS.

The DDS controlling section 200 can be composed of a Field Programmable Gate Array (hereinafter abbreviated as an FPGA). Instead of an FPGA, the DDS controlling section 200 may be composed of a custom LSI, an IC, or a discrete part.

Figure 3:
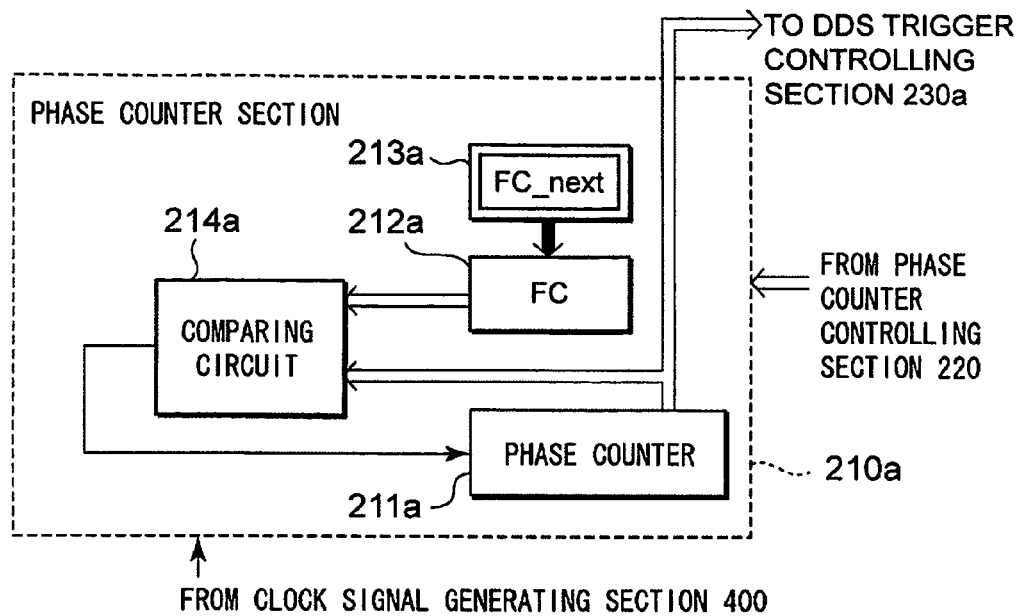
FIG. 3 is a block diagram showing the structure of a phase counter section.

FIG. 3 is a block diagram showing the structure of the phase counter section 210a. As shown in FIG. 3, the phase counter section 210a has a phase counter 211a, a register 212a, a register 213a, and a comparing circuit 214a. The phase counter 211a stores data that indicate the phase of the DDS 100a. The register 212a stores a current count upper limit value FC of the phase counter 211a. The register 213a stores a count upper limit value FC_next for the next setup change of the phase counter 211a. The comparing circuit 214a compares data stored in the register 212a with output data of the phase counter 211a and resets the phase counter 211a when they match. The values of the registers 212a and 213a are controlled through the phase counter controlling section 220 with commands issued from the computer section 300.

Since data FC stored in the register 212a designates the count upper limit value of the phase counter. When the phase counter reaches the count upper limit, the comparing circuit 214a resets the phase counter 211a. Thus, the data FC becomes a factor with which the duration of one period about the phase, namely the frequency stored in the phase counter 211a, is decided. When data that indicate a frequency of 0 Hz are loaded to the register 212a, the comparing circuit 214a stops the count-up operation corresponding to the clock signal, not resets the phase counter 211a. In other words, when data that indicate a frequency of 0 Hz are loaded to the register 212a, data of the same value are output from the phase counter 211a.

The structure of the phase counter section 210b is the same as the structure of the phase counter section 210a. In other words, the phase counter section 210b has a phase counter 211b, register 212b and 213b, and a comparing circuit 214b (not shown).

Figure 4:
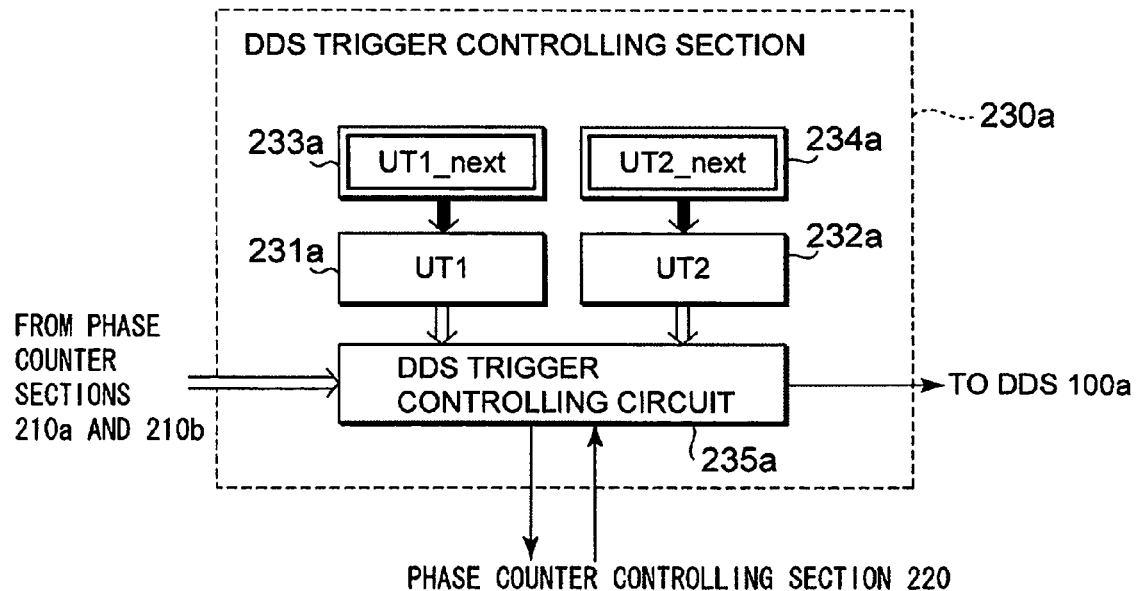
FIG. 4 is a block diagram showing the structure of a DDS trigger controlling section.

FIG. 4 is a block diagram showing the structure of the DDS trigger controlling section 230a. As shown in FIG. 4, the DDS trigger controlling section 230a has registers 231a, 232a, 233a, and 234a and a DDS trigger controlling circuit 235a. The register 231a stores data UT1 that indicate update timing at which the frequencies of sine waves that the DDS 100a and the DDS 100b are outputting are set to 0 Hz. The register 232a stores data UT2 that indicate update timing at which the sine waves are output after the frequencies became 0 Hz. The register 233a stores data UT1_next that indicate update timing for the next setup change. The register 234a stores data UT2_next that indicate update timing for the next setup change. The DDS trigger controlling circuit 235a controls the phase of the DDS 100a in such a manner that when data that indicate the phase and that are output from the phase counter section 210b match data UT1 stored in the register 231a, the DDS trigger controlling circuit 235a outputs a trigger signal that causes the output frequency of the DDS 100a to become 0 Hz and that when data that indicate the phase and that are output from the phase counter section 210a matches data UT2 stored in the register 232a, the DDS trigger controlling circuit 235a outputs a trigger signal that causes a sine wave to be output from the DDS 100a. When the output frequency is caused to become 0 Hz, the output signal is stopped. The structure (not shown) of the DDS trigger controlling section 230b is the same as that of the DDS trigger controlling section 230a. When the DDS trigger controlling section 230b controls the DDS 100b to change the phase thereof, the DDS trigger controlling section 230b sends a control signal to the DDS 100b like the DDS trigger controlling section 230b.

Next, the operations of the oscillating apparatus will be described. First of all, a phase change operation will be described. For example, the case of which the DDS 100a and the DDS 100b output sine waves having the same frequency and the same phase, the frequency of the DDS 100a is changed to f2, and the phase of the DDS 100a is delayed from that of the DDS 100b by 180 degrees will be described.

Figure 5:
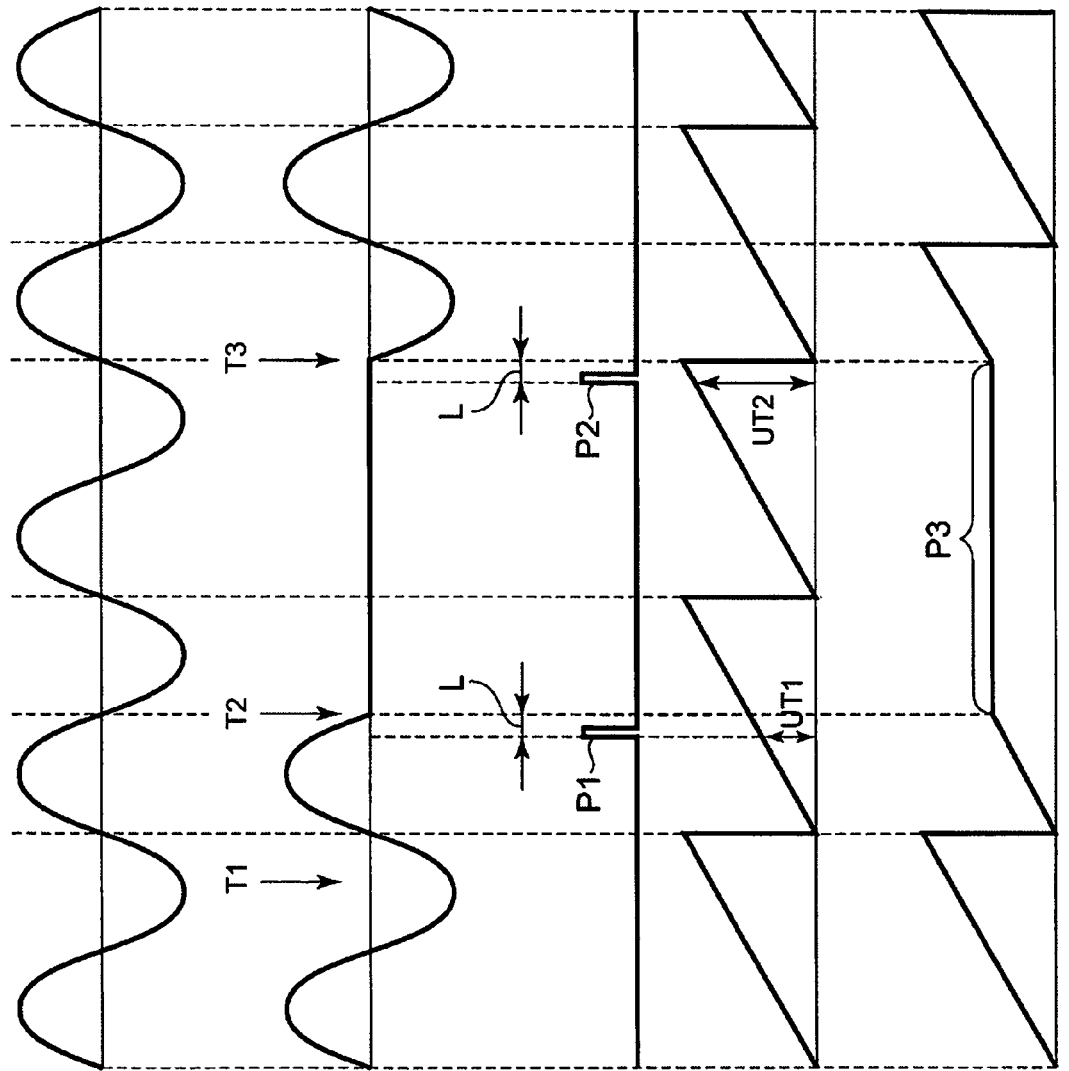
FIG. 5A to FIG. 5E are schematic diagrams showing waveforms of signals that are output from individual sections when a phase control is performed.

FIG. 5A to FIG. 5E show waveforms of signals that are output from individual sections of the oscillating apparatus. FIG. 5A shows a waveform of a signal that is output from the DDS 100b. FIG. 5B shows a waveform of a signal that is output from the DDS 100a. FIG. 5C shows a waveform of a phase change trigger signal that is output from the DDS controlling section 200 to the DDS 100a. FIG. 5D shows a waveform of a signal that indicates a counter value of the phase counter section 210b of the DDS controlling section 200. FIG. 5E shows a waveform of a signal that indicates a counter value of the phase counter section 210a of the DDS controlling section 200. The values of the phase accumulators 120a and 120b of the DDS 100a and the DDS 100b are different from the values of the phase counter sections 210a and 210b, respectively. However, the values of the phase accumulators 120a and 120b are the same as phase information of sine waves.

First, the case of which data that indicate frequency f1 are sent from the computer section 300 to the internal register 110a of the DDS 100a, the internal register 110b of the DDS 100b, and the phase counter section 210a of the DDS controlling section 200 and thereby the phase of the DDS 100a is delayed from that of the DDS 100b by 180 degrees will be described.

While the DDS 100a is outputting a sine wave having frequency f1, the computer section 300 loads data FC_next that indicate a frequency of 0 Hz to the internal register 110a of the DDS 100a and the register 213a of the phase counter section 210a of the DDS controlling section 200. At this point, the values of the phase counter section 210a and the phase accumulator 120a and the output frequency of the DDS 100a have not been changed to 0 Hz. Next, considering latency L intrinsic to the DDS 100a, the computer section 300 loads update timings UT1_next and UT2_next to the registers 233a and 234a of the DDS trigger controlling section 230a so that the phases of the sine waves are inverted. Thereafter, the computer section 300 sends the phase change trigger that causes the phase of the DDS 100a to be changed to the phase counter controlling section 220 at timing T1 shown in FIG. 5B. When the phase counter controlling section 220 receives the phase change trigger, the phase counter controlling section 220 loads data stored in the registers 233a and 234a of the DDS trigger controlling section 230a to the registers 231a and 232a, respectively.

The DDS trigger controlling section 230a reads the counter value of the phase counter 211b and sends frequency change signal P1 that causes the frequency to be changed to 0 Hz to the DDS 100a at update timing UT1 after the DDS trigger controlling section 230 has read the phase change trigger and the phase counter 211b has changed from a position with a phase of 0 degree first time. After the DDS trigger controlling section 230a has sent the frequency change signal P1 and a period of time for latency L has elapsed, namely, when the phase of the output sine wave of the DDS 100a becomes 180 degrees, the phase counter controlling section 220 loads data FC_next that indicate a frequency of 0 Hz stored in the register 213a of the phase counter section 210a to the register 212a. In addition, data that indicate frequency f1 are loaded to the register 213a. Since latency L of the DDS 100a is considered at update timing UT1, when the value of the output signal of the DDS 100a is 0 (at timing T2 shown in FIG. 5B), the frequency is changed to 0 Hz.

Thereafter, when the sine wave that is output from the DDS 100b is inverted, namely the phase counter 211b becomes a value that indicates that the phase is inverted by 180 degrees at update timing UT2 considering latency L, the frequency change signal P2 is sent to the DDS 100a. After the period of time for latency L has elapsed, the phase counter controlling section 220 loads data FC_next that indicate frequency f1 stored in the register 213a as data FC to the register 212a. While the frequency is 0 Hz (the output is stopped), the value of the phase counter section 210a as phase information of the DDS 100a and the value of the phase accumulator 120a of the DDS 100a do not change (P3 in FIG. 5E). In consideration of latency L, at timing T3, the sine wave is output with a phase of 180 degrees. Thus, the DDS 100a outputs a sine wave whose phase is inverted from the phase of the output signal of the DDS 100b.

In the foregoing example, by counting the number of clock pulses, considering the latency, the phases of sine waves are inverted, namely the phases of sine waves are caused to have a difference of 180 degrees. Instead, when update data UT1 and UT2 cause the DDS trigger controlling section 230a to output sine waves having a frequency of 0 Hz (outputs of sine waves are stopped) for any number of clock pulses, the phases of sine waves can be changed for any amounts. To stop the outputs of sine waves at 0 V, by changing only update timing UT2 rather than update timing UT1, the sine waves have a difference of phases.

Thus, when the phases of sine waves that are output from the DDS 100a and the DDS 100b are changed, in consideration of the latency, the outputs of the sine waves are stopped with a phase of 180 degrees or 360 degrees, namely the values of the sine waves become 0. After a predetermined period of time has elapse, sine waves whose values are 0 (with a phase of 0 degree or 180 degrees) are output.

When a BPF is disposed on the output side, if sine waves having positive values or negative values are stopped, it takes a time until the output signals become stable. However, according to this embodiment, when the output values of signals are 0, the outputs of the signals are stopped for a predetermined period of time. Thus, sine waves can be accurately output in a short transient period.

When the phase resolutions of the phase counter sections 210a and 210b of the DDS controlling section 200 are higher than those of the phase offset adjustment registers of the internal registers 110a and 110b of the DDS 100a and the DDS 100b, for example the bit resolutions of the phase offset adjustment registers are 12 bits and the bit resolutions of the phase counter sections 210a and 210b are 48 bits, the phases of sine waves can be more accurately controlled than the DDS 100a and the DDS 100b.

It may be necessary for a measurement instrument or the like to accurately measure the gain of its amplifier.

Figure 6:
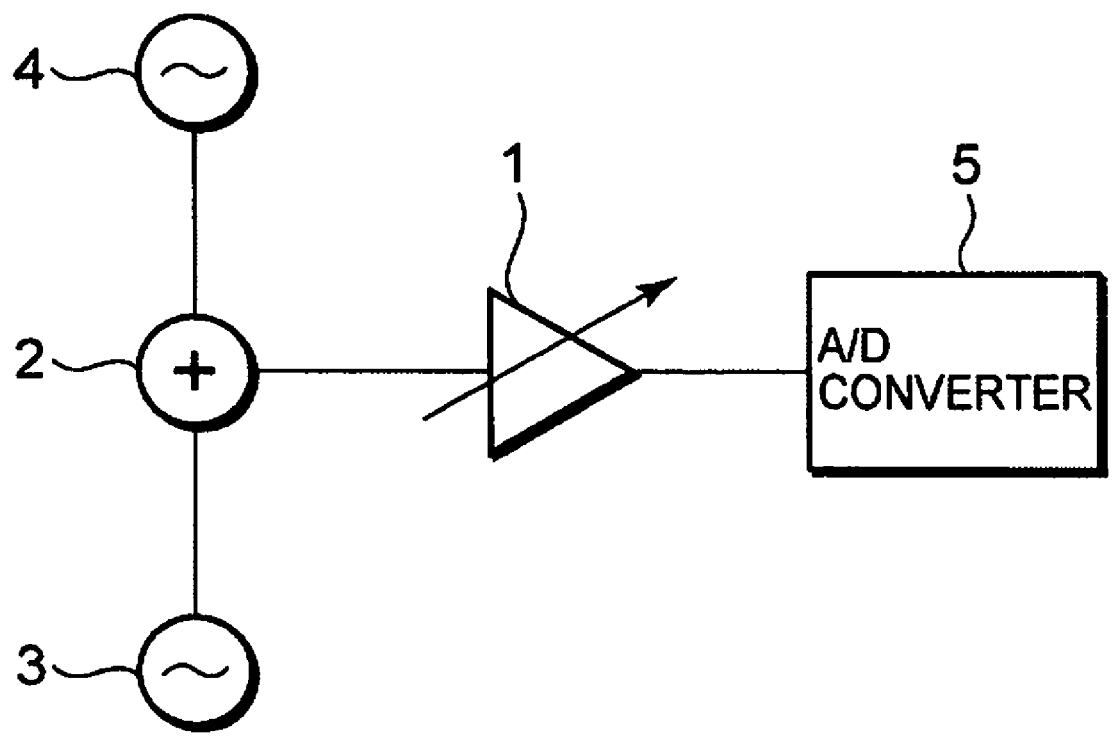
FIG. 6 is a block diagram showing a structure of circuitry that obtains the gain of an amplifier.

FIG. 6 is a block diagram showing the structure of circuitry that obtains the gain of an amplifier. As shown in FIG. 6, an output of an adding device 2 is connected to an input of an amplifier 1 to be measured for a gain. Outputs of signal sources 3 and 4 that generate sine waves are connected to two inputs of the adding device 2. In addition, an input of an A/D converter 5 is connected to an output of the amplifier 1.

When the gain of the amplifier 1 is 1, the signal sources 3 and 4 output signals $S_1(t)$ and $S_2(t)$ of sine waves whose amplitudes are A, frequencies are f, and phase difference is 0. In other words, the following relationship is satisfied.

$$S_1(t)=S_2(t)=A\cdot\sin(2\pi ft)$$

Since the outputs of the signal sources 3 and 4 are added by the adding device 2, the input of the A/D converter can be expressed as follows.

$$S_1(t)+S_2(t)=2A\cdot\sin(2\pi ft)$$

In other words, the amplitude of the sine wave that is input to the A/D converter 5 is 2A.

Next, $S_3(t)$ and $S_4(t)$ whose amplitudes are A, frequencies are f, and phase difference is θ are output from the signal sources 3 and 4. The gain of the amplifier 1 is denoted by G. In other words, the following relationship is satisfied.

$$S_3(t)=A\cdot\sin(2\pi ft),\ S_4(t)=A\cdot\sin(2\pi ft+\theta)$$

The signals that are output from the signal sources 3 and 4 are added by the adding device 2. The amplifier 1 amplifies the amplitudes of the signals at amplification factor G. Thus, the following relationship is satisfied.

$$\{S_3(t)+S_4(t)\}\cdot G=2A\cdot\cos(\theta/2)\cdot\sin(2\pi ft+\theta/2)\cdot G$$

Thus, the amplitude of the signal that is input to the A/D converter 5 can be expressed as follows.

$$2A\cdot\cos(\theta/2)\cdot G$$

The amplitude of a signal whose gain is 1 needs to be the same as the amplitude of a signal whose gain is G as much as possible to prevent the obtained gain from being adversely affected by nonlinearity of the A/D converter 5.

In other words, the following relationship is satisfied.

$$2A=2A\cdot\cos(\theta/2)\cdot G$$

Thus, $\cos(\theta/2)=1/G$

For example, using the bisection method or the like, the set value of θ is varied. Phase θ' at which the amplitude of the input of the A/D converter 5 with a gain of 1 becomes the same as the amplitude of that with gain G is obtained. At this point, gain G is calculated by $1/\cos(\theta'/2)$. Using this method, gain G of the amplifier 1 can be obtained in the state that the amplitude value of the signal that is input to the A/D converter 5 with a gain of 1 is the same as the amplitude value of that with gain G in the range of the phase resolutions of the signal sources 3 and 4. Thus, the gain of the A/D converter 5 is almost not affected by nonlinearity of the A/D converter 5. In other words, the higher the resolution of the phase difference of output signals of the signal sources 3 and 4, the more accurately the gain of the amplifier 1 can be measured.

A Frequency Shift Keying terminal (hereinafter abbreviated as an FSK terminal) may be disposed in a DDS. The FSK terminal allows data of one of two frequencies stored in an DDS to be selected when an "H" signal or an "L" signal is input. Next, an embodiment using such DDSs will be described.

Figure 7:
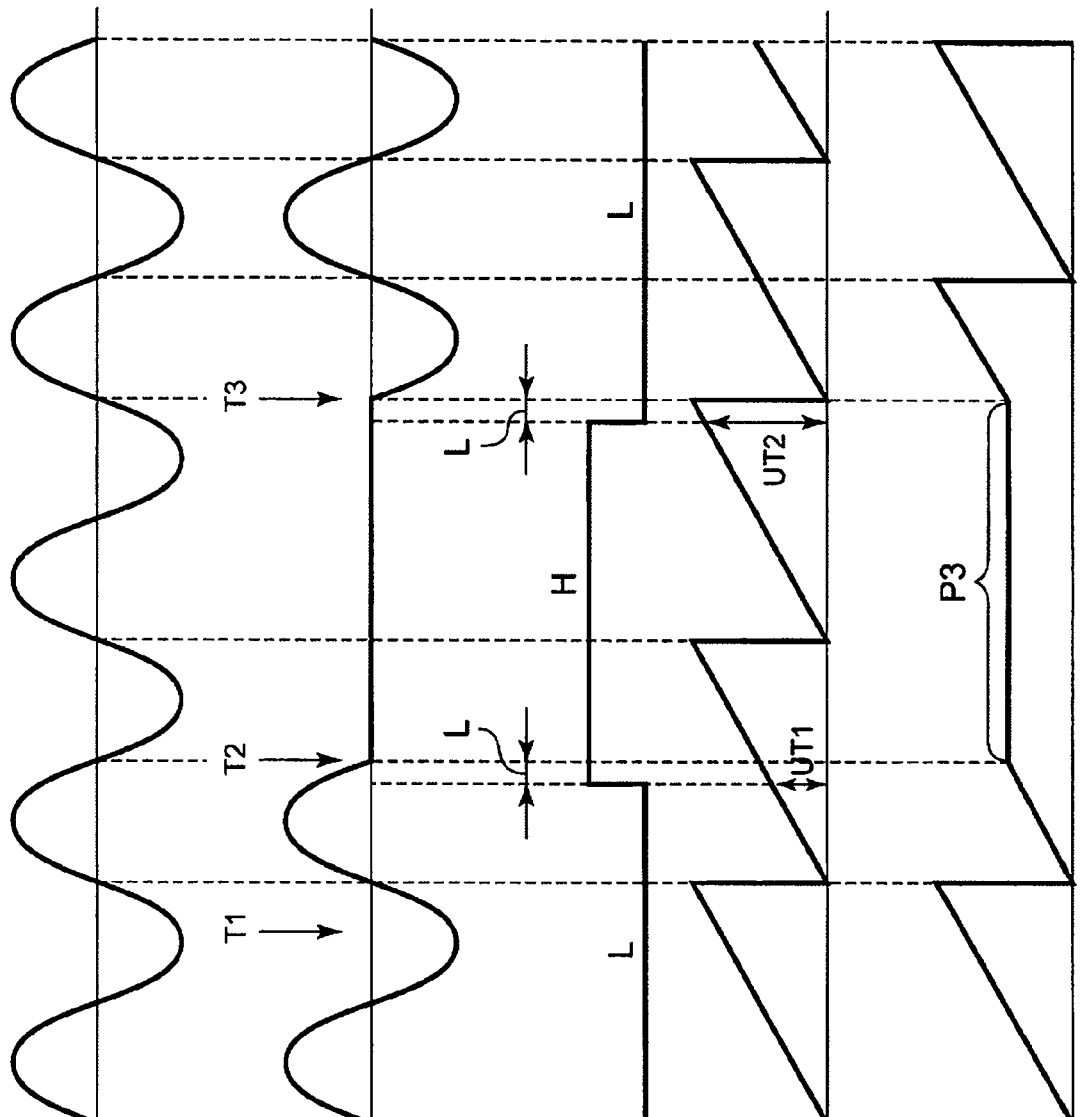
FIG. 7A to FIG. 7E are schematic diagrams showing waveforms of signals that are output from individual sections when an FSK terminal of a DDK according to an embodiment of the present invention is used.

FIG. 7A to FIG. 7E are schematic diagrams showing waveforms of signals that are output from individual sections of an oscillating apparatus according to this embodiment. FIG. 7A shows a waveform of a signal that is output from a DDS 100b. FIG. 7B shows a waveform of a signal that is output from a DDS 100a. FIG. 7C shows a waveform of a phase change trigger signal that is output from a DDS controlling section 200 to the DDS 100a. FIG. 7D shows a waveform of a signal that indicates a counter value of a phase counter section 210b of the DDS controlling section 200. FIG. 7E shows a waveform of a signal that indicates a counter value of a phase counter section 210a of the DDS controlling section 200.

The oscillating apparatus according to this embodiment is the same as that shown in FIG. 1 to FIG. 4 except for the following points. When signal "L" is input to the FSK terminal of the DDS 100a, a computer section 300 causes the DDS 100a to output a sine wave having frequency f1. When signal "H" is input to the FSK terminal of the DDS 100a, the computer section 300 causes the DDS 100a to output a sine wave having a frequency of 0 Hz (namely, no output). When the count value of a phase counter 211a becomes UT1, a DDS trigger controlling circuit 235a inputs signal "H" to the FSK terminal of the DDS 100a. When the value of the phase counter section 210a becomes UT2, the DDS trigger controlling circuit 235a outputs signal "L" to the FSK terminal of the DDS 100a.

In the foregoing embodiments, the case of which two DDSs were disposed was described. Instead, when three or more DDSs are disposed, the phases of signals can be controlled in the same manner as the foregoing embodiment. In other words, when N DDSs (where N is 3 or greater) are disposed, the phases of signals are controlled in such a manner that based on one DDS the phases of signals of the other DDSs have differences.

FIG. 8 is a block diagram showing an oscillating apparatus having two DDSs whose phases are changed according to another embodiment of the present invention. Similar portions to those in FIG. 1 are denoted by similar reference numerals and their redundant description will be omitted. A DDS controlling section 500 supplies a clock signal that is output from a clock generating section 400 to a DDS 100b. The DDS controlling section 500 stops supplying the clock signal to the DDS 100a for a predetermined period of time.

FIG. 9A to FIG. 9C are schematic diagrams showing waveforms of signals that are output from or input to individual sections of the oscillating apparatus shown in FIG. 8. FIG. 9A shows a waveform of a signal that is output from the DDS 100b. FIG. 9B shows a waveform of a signal that is output from the DDS 100a. FIG. 9C shows a waveform of a clock signal supplied to the DDS 100a.

As shown in FIG. 9A to FIG. 9C, the clock signal is directly supplied to the DDS 100b and it continuously outputs a signal of a sine wave, whereas the clock signal supplied to the DDS 100a is stopped at intervals of a predetermine period of time under the control of the DDS controlling section 500. Thus, when the stop period of the clock signal is controlled, the output signals of the two DDS 100a and 100b can have a difference of phases. When the clock signal is stopped for 180 degrees of the sign wave, the DDS 100a outputs a sine wave whose phase is inverted from a sine wave that the DDS 100b outputs.

According to the foregoing embodiments, the phase counter section 210a uses the phase counter 211a. Instead, the phase counter section 210a may use a phase accumulator like the DDS 100a. Alternatively, the DDS 100a may use a phase counter instead of the phase accumulator 120a.

In addition, according to the foregoing embodiments, the DDSs output sine waves. Instead, the DDSs may output square waves, triangular waves, or the like.

Next, a frequency changing operation for sine waves that are output from the DDSs will be described.

FIG. 10A to FIG. 10C are schematic diagrams showing waveforms of signals that are output from individual sections of the oscillating apparatus when the frequencies of sine waves are changed. FIG. 10A shows a waveform of a sine wave that is output from the DDS 100a. FIG. 10B shows a waveform of a sine wave that is output from the DDS 100b. FIG. 10C shows a waveform of a signal that indicates a count value of each of the phase counter 211a and the phase counter 211b.

Next, the case of which the frequencies of signals that are output from the DDS 100a and the DDS 100b are changed from f2 to f3 will be described. When the two DDS 100a and DDS 100b output sine waves having frequency f2, data that indicate frequency f2 are stored in registers 212a and 212b.

Thereafter, a computer section 300 loads data that indicate frequency f3 to the DDS 100a and the DDS 100b. In addition, the computer section 300 loads data that indicate frequency f3 to a register 213a and a register 213b of a phase counter section 210a and a phase counter section 210b and data that indicate update timing UT3 to a register 234a and a register 234b of a DDS trigger controlling section 230a and a DDS trigger controlling section 230b, respectively. In addition, the computer section 300 loads data that indicate latency L to a phase counter controlling section 220.

The computer section 300 sends a frequency change notification signal to a DDS controlling section 200 at timing T4 shown in FIG. 10. When the DDS trigger controlling sections 230a and 230b receive the frequency change notification signal, they compare values stored in the phase counter section 210a and the phase counter section 210b with data stored in the register 232a and the register 232b, respectively. When they match, the DDS trigger controlling sections 230a and 230b output frequency change triggers to the DDS 100a and the DDS 100b, respectively. In other words, the DDS trigger controlling sections 230a and 230b output the frequency change triggers both to the DDS 100a and DDS 100b with a phase of 360 degrees of sine waves having frequency f2 earlier by latency L at timing T5 shown in FIG. 10. Thereafter, data FC_next that indicate frequency f3 stored in the registers 213a and 213b of the phase counter sections 210a and 210b of the phase counter controlling section 220 are loaded to the registers 212a and 212b with a phase of 360 degrees. In other words, the phase counter sections 210a and 210b perform count operations with sine waves having frequency f3.

The DDS controlling section 200 sends frequency change triggers to the DDS 100a and DDS 100b, considering latency L. Thus, the DDS 100a and DDS 100b output sine waves having frequency f3 when the phases of sine waves having frequency f2 become 360 degrees. Thus, the transient period necessary for changing frequencies is short and unnecessary signals are prevent from occurring.

In the foregoing examples, the frequencies of the DDS 100a and the DDS 100b are changed. Instead, the frequency of one DDS may be changed. In this case, a frequency change trigger may be sent to a desired DDS instead of the DDS controlling section 200.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

For example, in the oscillating apparatus according to the embodiment shown in FIG. 1, when two DDSs are controlled, the DDS controlling section 200 has two phase counters and two DDS trigger controlling sections. Instead, the phase counter and the DDS trigger controlling section may be disposed in a DDS for which the phase of a signal is not changed. In other words, only the phase counter section 210*b* and the DDS trigger controlling section 230*b* for the DDS 100*b* may be used. Based on the phase difference, the phase count of the DDS 100*a* may be calculated.

What is claimed is:

1. A phase controlling apparatus which controls phases of signals which are output from a plurality of signal sources corresponding to first phase information which indicates a phase of a predetermined signal, the apparatus comprising:
   phase information storing means for storing second phase information which indicates a phase of a signal which is output from each of the plurality of signal sources; and
   phase controlling means for changing a phase of a signal which is output from at least one of the plurality of signal sources corresponding to the second phase information stored in the phase information storing means to control a difference of the phases of signals which are output from the plurality of signal sources,
   wherein when a value of a signal which is output from a signal source under control becomes zero, the phase controlling means controls the signal source to stop outputting the signal and after a predetermined period of time has elapsed, the phase controlling means controls the signal source to start outputting the signal.

2. The phase controlling apparatus as set forth in claim 1, wherein the plurality of signal sources have phase offset adjusting means for shifting phases of signals which are output from the plurality of signal sources,
   wherein the second phase information has a higher phase resolution than the phase offset adjusting means does.

3. The phase controlling apparatus as set forth in claim 1, wherein the phase controlling means starts controlling the signal source early for a predetermined period of time necessary after a control signal is input to the signal source until it outputs a signal corresponding to the control signal.

4. The phase controlling apparatus as set forth in claim 1, wherein the plurality of signal sources are direct digital synthesizers which output sine waves.

5. A phase controlling apparatus which controls phases of signals which are output from a plurality of signal sources corresponding to first phase information which indicates a phase of a predetermined signal, the apparatus comprising:
   phase information storing means for storing second phase information which indicates a phase of a signal which is output from each of the plurality of signal sources;
   phase controlling means for changing a phase of a signal which is output from at least one of the plurality of signal sources corresponding to the second phase information stored in the phase information storing means to control a difference of the phases of signals which are output from the plurality of signal sources; and
   clock signal generating means for generating a clock signal to each section of the phase controlling apparatus and each of the plurality of signal sources which are operated based on the clock signal,
   wherein the phase information storing means has a phase counter which performs a count operation with the clock signal, and
   wherein the phase controlling means has:
      a first register which stores first phase timing information with which a control signal which causes a signal source under control to stop outputting the signal is sent;
      a second register which stores second phase timing information with which a control signal which causes the signal source under control to start outputting the signal is sent; and
      control signal sending means for comparing phase information which is output from the phase counter of the phase information storing means corresponding to a reference signal source with the first phase timing information stored in the first register and sending the control signal to the signal source under control, the control signal causing the signal source under control to stop outputting the signal when they match, and for comparing phase information which is output from the phase counter with the second phase timing information stored in the second register and sending the control signal to the signal source under control, the control signal causing the signal source under control to start outputting the signal when they match.

6. An oscillating apparatus, comprising:
   a plurality of signal sources which output signals corresponding to first phase information which indicates a phase of a predetermined signal;
   phase information storing means for storing second phase information which indicates a phase of a signal which is output from each of the plurality of signal sources; and
   phase controlling means for changing a phase of a signal which is output from at least one of the plurality of signal sources corresponding to the second phase information stored in the phase information storing means to control a difference of the phases of signals which are output from the plurality of signal sources,
   wherein when a value of a signal which is output from a signal source under control becomes zero, the phase controlling means controls the signal source to stop outputting the signal and after a predetermined period of time has elapsed, the phase controlling means controls the signal source to start outputting the signal.

7. The oscillating apparatus as set forth in claim 6, wherein the plurality of signal sources have phase offset adjusting means for shifting phases of signals which are output from the plurality of signal sources,
   wherein the second phase information has a higher phase resolution than the phase offset adjusting means does.

8. The oscillating apparatus as set forth in claim 6, wherein the phase controlling means starts controlling the signal source early for a predetermined period of time necessary after a control signal is input to the signal source until it outputs a signal corresponding to the control signal.

9. The oscillating apparatus as set forth in claim 6, wherein the plurality of signal sources are direct digital synthesizers which output sine waves.

10. An oscillating apparatus, comprising:
    a plurality of signal sources which output signals corresponding to first phase information which indicates a phase of a predetermined signal;
    phase information storing means for storing second phase information which indicates a phase of a signal which is output from each of the plurality of signal sources;
    phase controlling means for changing a phase of a signal which is output from at least one of the plurality of signal sources corresponding to the second phase information stored in the phase information storing means to control a difference of the phases of signals which are output from the plurality of signal sources; and
    clock signal generating means for generating a clock signal to each section of the oscillating apparatus and each of the plurality of signal sources which are operated based on the clock signal, wherein the phase information storing means has a phase counter which performs a count operation with the clock signal, and wherein the phase controlling means has:

a first register which stores first phase timing information with which a control signal which causes a signal source under control to stop outputting the signal is sent;

a second register which stores second phase timing information with which a control signal which causes the signal source under control to start outputting the signal is sent; and control signal sending means for comparing phase information which is output from the phase counter of the phase information storing means corresponding to a reference signal source with the first phase timing information stored in the first register and sending the control signal to the signal source under control, the control signal causing the signal source under control to stop outputting the signal when they match, and for comparing phase information which is output from the phase counter with the second phase timing information stored in the second register and sending the control signal to the signal source under control, the control signal causing the signal source under control to start outputting the signal when they match.

11. A frequency controlling apparatus which controls a frequency of a signal which is output from a signal source corresponding to first phase information which indicates a phase of a predetermined signal, the apparatus comprising:

phase information storing means for storing second phase information which indicates a phase of the signal which is output from the signal source;

frequency controlling means for sending a control signal to the signal source, the control signal causing the signal source to change the frequency of the signal with a phase of 360 degrees corresponding to the second phase information stored in the phase information storing means; and clock signal generating means for generating a clock signal to each section of the frequency controlling apparatus which are operated based on the clock signal, wherein the phase information storing means has a phase counter which performs a count operation with the clock signal, and wherein the frequency controlling means has:

a register which stores phase timing information with which a control signal which causes the frequency of the signal which is output from the signal source to be changed is sent; and control signal sending means for comparing phase information which is output from the phase counter with the phase timing information stored in the register and sending the control signal to the signal source under control, the control signal causing the frequency of the signal which is output from the signal source to be changed when they match.

12. The frequency controlling apparatus as set forth in claim 11, wherein the frequency controlling means starts controlling the signal source early for a predetermined period of time necessary after a control signal is input to the signal source until it outputs a signal corresponding to the control signal.

13. The frequency controlling apparatus as set forth in one of claim 11, wherein the signal source is a direct digital synthesizer which outputs a sine wave.

* * * * *